United States Patent
Liu

(10) Patent No.: US 10,219,542 B2
(45) Date of Patent: Mar. 5, 2019

(54) ELECTRONIC CIGARETTE IDENTIFICATION DEVICE, ELECTRONIC CIGARETTE CASE, AND METHOD FOR IDENTIFYING ELECTRONIC CIGARETTE

(71) Applicant: SHENZHEN KIMSEN TECHNOLOGY CO., LTD, Shenzhen, Guangdong (CN)

(72) Inventor: Qiuming Liu, Guangdong (CN)

(73) Assignee: SHENZHEN KIMSEN TECHNOLOGY CO., LTD, Shenzhen (CN)

( * ) Notice: Subject to any disclaimer, the term of this patent is extended or adjusted under 35 U.S.C. 154(b) by 78 days.

(21) Appl. No.: 15/111,782

(22) PCT Filed: Jan. 14, 2014

(86) PCT No.: PCT/CN2014/070613
§ 371 (c)(1),
(2) Date: Jul. 14, 2016

(87) PCT Pub. No.: WO2015/106390
PCT Pub. Date: Jul. 23, 2015

(65) Prior Publication Data
US 2016/0345627 A1 Dec. 1, 2016

(51) Int. Cl.
*A24F 47/00* (2006.01)
*G06K 7/10* (2006.01)
(Continued)

(52) U.S. Cl.
CPC ........ *A24F 47/008* (2013.01); *G06K 7/10009* (2013.01); *G06K 7/10366* (2013.01); *G06K 19/0723* (2013.01); *A24F 15/00* (2013.01)

(58) Field of Classification Search
CPC .... A24F 47/00; A24F 47/002; G06K 7/10366
See application file for complete search history.

(56) References Cited

U.S. PATENT DOCUMENTS 9,769,878 B2 * 9/2017 Xiang ................. H05B 1/0252
9,877,512 B2 * 1/2018 Liu ....................... H02J 7/0052
(Continued)

FOREIGN PATENT DOCUMENTS

CN         1627590 A      6/2005
CN       201910649 U      7/2011

OTHER PUBLICATIONS

International Search Report of PCT Patent Application No. PCT/CN2014/070613 dated Sep. 5, 2014.

*Primary Examiner* — Carlos Garcia

(57) ABSTRACT

An electronic cigarette identification device, electronic cigarette case, and a method for identifying an electronic cigarette, the device comprises an electronic cigarette and an electronic cigarette case, the electronic cigarette comprises an identification information generation module, and the electronic cigarette case comprises a power supply battery, a microprocessor, and an identification information receiving module; the microprocessor is connected to the power supply battery and the identification information receiving module; the identification information generation module outputs an identification information to the identification information receiving module by means of wired or wireless transmission; the identification information receiving module receives, converts and sends the identification information to the microprocessor; the microprocessor identifies whether the electronic cigarette case and the electronic cigarette match. Thus the invention avoids the problems of being impossible to know whether the electronic cigarette case matches the electronic cigarette before charging, and being impossible to stop the charging if mismatching.

18 Claims, 7 Drawing Sheets

(51) Int. Cl.
*G06K 19/07* (2006.01)
*A24F 15/00* (2006.01)

(56) References Cited

U.S. PATENT DOCUMENTS

| | | | |
|---|---|---|---|
| 9,894,932 B2* | 2/2018 | Liu | A24F 47/008 |
| 2015/0075545 A1* | 3/2015 | Xiang | A24F 47/008 |
| | | | 131/329 |
| 2015/0189695 A1* | 7/2015 | Xiang | G06K 7/10861 |
| | | | 219/209 |
| 2017/0020191 A1* | 1/2017 | Lamb | A24F 47/008 |

* cited by examiner

ELECTRONIC CIGARETTE IDENTIFICATION DEVICE, ELECTRONIC CIGARETTE CASE, AND METHOD FOR IDENTIFYING ELECTRONIC CIGARETTE

TECHNICAL FIELD

The present application relates to the technical field of daily electronic products, and more particularly, relates to an electronic cigarette identification device, an electronic cigarette case, and a method for identifying electronic cigarette.

BACKGROUND

Electronic cigarette is a kind of atomization device on heating smoke liquid, providing consumers with a substitute for cigarettes.

Normally, an electronic cigarette is stored in an electronic cigarette case. The appearance of the electronic cigarette case is similar to an ordinary cigarette case, but it is different with the ordinary cigarette case. For the purpose of charging, a charging circuit is usually arranged in the existing electronic cigarette case, so that the electronic cigarette case can recharge a battery rod in the electronic cigarette.

Owing to different battery voltage and battery capacity in different electronic cigarettes, a corresponding power supply battery in electronic cigarette case is different as well. During charging process, if the electronic cigarette case does not matched with the electronic cigarette, then if a current is too large to charge, there will be a shortening of a life-span of a battery rod of the electronic cigarette or a damage to the battery rod in the electronic cigarette, or an explosion of the battery rod. Also, the power supply battery in the electronic cigarette case or other circuit elements may be damaged.

Therefore, the prior art exists a problem that users cannot know whether the electronic cigarette case matches the electronic cigarette or not before charging, and the charging cannot be immediately stopped when the electronic cigarette case and the electronic cigarette do not match with each other.

BRIEF SUMMARY

The object of the present application is to provide an electronic cigarette identification device, an electronic cigarette case, and a method for identifying electronic cigarette, aiming at the drawbacks in the prior art that, it is difficult to know whether the electronic cigarette case matches the electronic cigarette or not before charging, and the charging cannot be immediately stopped when the electronic cigarette case and the electronic cigarette do not match with each other.

In accordance with one aspect of the present application, the present application provides an electronic cigarette identification device, comprising an electronic cigarette and an electronic cigarette case for identifying the electronic cigarette, wherein, the electronic cigarette comprises an identification information generation module, and the electronic cigarette case comprises a power supply battery, a microprocessor, and an identification information receiving module;

the microprocessor is connected to the power supply battery and the identification information receiving module respectively;

the power supply battery is used to store electrical power and provide a voltage;

the identification information generation module is used for outputting an identification information to the identification information receiving module by means of wired or wireless transmission;

the identification information receiving module is used for receiving the identification information and converting the identification information, then sending to the microprocessor;

the microprocessor is used for identifying, according to a converted identification information, whether the electronic cigarette case and the electronic cigarette match.

Advantageously, in the electronic cigarette identification device of the present application, the electronic cigarette case further comprises a trigger circuit which is connected to the microprocessor, the trigger circuit is used for sending a trigger signal to the microprocessor, the microprocessor is also used for identifying the electronic cigarette after receiving the trigger signal.

Advantageously, in the electronic cigarette identification device of the present application, the identification information generation module outputs the identification information to the identification information receiving module by a wireless transmission mode, the identification information generation module is also used for prestoring the identification information;

the identification information receiving module comprises a RFID reader chip, the identification information generation module comprises a RFID tag chip;

or the identification information receiving module comprises a NFC reader chip, the identification information generation module comprises a NFC tag chip;

or the identification information receiving module comprises a zigbee reader chip, the identification information generation module comprises a zigbee tag chip.

Advantageously, in the electronic cigarette identification device of the present application, the identification information generation module outputs the identification information to the identification information receiving module by a wireless transmission mode, the identification information generation module is also used for prestoring the identification information;

wherein, the identification information generation module comprises an encoder, a modulation circuit, a carrier oscillation circuit and a second antenna; the identification information receiving module comprises a first antenna, a signal amplification circuit, a demodulation circuit and a decoder;

the modulation circuit is connected to the encoder, the carrier oscillation circuit and the second antenna respectively; the first antenna, the signal amplification circuit, the demodulation circuit and the decoder are connected successively;

the encoder is used for prestoring and encoding the identification information, the carrier oscillation circuit is used to generate a carrier wave, the modulation circuit is used to modulate the identification information encoded by the encoder into the carrier wave generated by the carrier oscillation circuit, the second antenna is used for converting the identification information which is modulated into the carrier wave into a radio frequency signal containing the identification information, then outputting the radio frequency signal;

the first antenna is used to receive the radio frequency signal outputted by the second antenna and transfer the radio frequency signal into an electrical signal containing the identification information, the signal amplification circuit, the demodulation circuit and the decoder are successively used to amplify, demodulate and decode the electrical signal.

Advantageously, in the electronic cigarette identification device of the present application, the identification information generation module outputs the identification information to the identification information receiving module by a wired transmission mode;

the identification information generation module comprises a voltage dividing circuit; the identification information receiving module comprises a voltage comparison circuit; the electronic cigarette case further comprises a first interface, the electronic cigarette further comprises a second interface which is matched mutually with the first interface;

the voltage dividing circuit is connected to the second interface; the voltage comparison circuit and the power supply battery are connected to the first interface respectively;

the first interface and the second interface are connected mutually to realize an electrical connection between the electronic cigarette and the electronic cigarette case, the voltage dividing circuit is used to connect with the power supply battery through the second interface and the first interface when the second interface is connected with the first interface, and then the voltage diciding circuit is used to output a voltage through the second interface and the first interface as the identification information; the voltage comparison circuit is used to receive the voltage and compare the voltage with a predetermined voltage, then output a comparison information to the microprocessor.

Advantageously, in the electronic cigarette identification device of the present application, the first interface and the second interface both comprise power supply anode connection terminals, power supply cathode connection terminals and identification information connection terminals, the model number of the microprocessor is SN8P2711;

the voltage dividing circuit comprises a first divider resistance and a second divider resistance; the voltage comparison circuit comprises a comparator;

a power supply anode connection terminal of the first interface is connected to a positive electrode of the power supply battery, a power supply cathode connection terminal of the first interface is connected to a negative electrode of the power supply battery, an identification information connection terminal of the first interface is connected to an inphase input terminal of the comparator, an inverting input terminal of a comparator is connected with the eighth pin of the microprocessor, a positive power terminal of the comparator is connected to the positive electrode of the power supply battery, a negative power terminal of the comparator is connected to ground, an output terminal of the comparator is connected to the seventh pin of the microprocessor; one terminal of the first divider resistance is connected to a power supply anode connection terminal of the second interface, and the other terminal of the first divider resistance is connected to one terminal of the second divider resistance and an identification information connection terminal of the second interface, the other terminal of the second divider resistance is connected to a power supply cathode connection terminal of the second interface.

Advantageously, in the electronic cigarette identification device of the present application, the electronic cigarette case further comprises a first interface, the electronic cigarette further comprises a second interface which is matched mutually with the first interface, and a battery rod which is used to store electrical power for providing the voltage to an atomization of the electronic cigarette, the battery rod is connected to the identification information generation module and the second interface respectively, the first interface is connected to the power supply battery;

the first interface and the second interface is used to mutually connected with each other to realize an electrical connection between the electronic cigarette and the electronic cigarette case, thus to realize that the battery rod can be charged by the power supply battery.

Advantageously, in the electronic cigarette identification device of the present application, the electronic cigarette case further comprises a switch circuit which is connected with the first interface and the power supply battery respectively;

the microprocessor is also used to output a control signal to the switch circuit according to a matching result of the electronic cigarette case and the electronic cigarette; the switch circuit is used to connect or disconnect an electrical connection path between the first interface and the power supply battery, on the basis of the control signal from the microprocessor, so that a charging path between the electronic cigarette case and the electronic cigarette is switched on or switched off.

Advantageously, in the electronic cigarette identification device of the present application, the switch circuit comprises a MOS tube, a model number of the microprocessor is SN8P2711;

wherein, the fourth pin of the microprocessor is connected to a grid of the MOS tube, a source electrode of the MOS tube is connected to a negative electrode of power supply battery, a drain electrode of the MOS tube is connected to the first interface.

Advantageously, in the electronic cigarette identification device of the present application, the electronic cigarette case further comprises a status indication circuit which is connected to the microprocessor;

the microprocessor is also used to output an indication signal to the status indication circuit according to a matching result of the electronic cigarette case and the electronic cigarette; the status indication circuit is used to output a prompt information which is corresponding to a matching status or a non-matching status of the electronic cigarette case and the electronic cigarette, on the basis of the indication signal of the microprocessor.

Advantageously, in the electronic cigarette identification device of the present application, the status indication circuit comprises a light emitting diode, a model number of the microprocessor is SN8P2711;

the fifth pin of the microprocessor is connected to a cathode of the light emitting diode; an anode of the light emitting diode is connected to a positive electrode of the power supply battery.

Advantageously, in the electronic cigarette identification device of the present application, the electronic cigarette case further comprises a first interface, a trigger circuit, a status indication circuit and a switch circuit; the electronic cigarette further comprises a second interface which is matched mutually with the first interface, and a battery rod which is used to store electrical power and to provide a voltage to an atomization of the electronic cigarette, the first interface, the switch circuit and the power supply battery are connected successively, the switch circuit, the trigger circuit and the status indication circuit are connected to the microprocessor respectively; the battery rod is connected to the identification information generation module and the second interface respectively, the trigger circuit is used for sending a trigger signal to the microprocessor, the microprocessor is also used for identifying the electronic cigarette after receiving the trigger signal;

the microprocessor is also used to output an indication signal to the status indication circuit according to a matching result of the electronic cigarette case and the electronic cigarette; the status indication circuit is used to output a prompt information which is corresponding to a matching status or a non-matching status of the electronic cigarette case and the electronic cigarette, on the basis of the indication signal of the microprocessor;

the first interface and the second interface is used to mutually connected with each other to realize an electrical connection between the electronic cigarette and the electronic cigarette case, thus to realize that the battery rod can be charged by the power supply battery;

the microprocessor is also used to output a control signal to the switch circuit according to the matching result of the electronic cigarette case and the electronic cigarette; the switch circuit is used to connect or disconnect an electrical connection path between the first interface and the power supply battery, on the basis of the control signal from the microprocessor, so that a charging path between the electronic cigarette case and the electronic cigarette is switched on or switched off.

In accordance with one aspect of the present application, the present application provides an electronic cigarette case of the electronic cigarette identification device, enabling an identification of an electronic cigarette, the electronic cigarette outputs an identification information to the electronic cigarette case by means of wired or wireless transmission, wherein, the electronic cigarette case comprises a power supply battery, a microprocessor, and an identification information receiving module;

the microprocessor is connected to the power supply battery and the identification information receiving module respectively;

the power supply battery is used to store electrical power and provide a voltage;

the identification information receiving module is used for receiving identification information and converting the identification information, then sending to the microprocessor;

the microprocessor is used for identifying, according to a converted identification information, whether the electronic cigarette case and the electronic cigarette match.

Advantageously, in the electronic cigarette case of the present application, the electronic cigarette case further comprises a trigger circuit which is connected to the microprocessor, the trigger circuit is used for sending trigger signal to the microprocessor, the microprocessor is also used for identifying the electronic cigarette after receiving the trigger signal.

In accordance with one aspect of the present application, the present application also provides a method for identifying an electronic cigarette which is used for identifying the electronic cigarette by an electronic cigarette case, wherein, the method comprises the following steps:

S1: an identification information generation module in the electronic cigarette outputs an identification information to an identification information receiving module in the electronic cigarette case by means of wired or wireless transmission;

S2: the identification information receiving module receives the identification information and converts the identification information, then sends to a microprocessor;

S3: according to a converted identification information, the microprocessor identifies whether the electronic cigarette case and the electronic cigarette match.

Advantageously, in the method for identifying an electronic cigarette of the present application, a following step is further comprised before the step S2:

S12: a trigger circuit sends a trigger signal to the microprocessor, the microprocessor identifies the electronic cigarette after receiving the trigger signal.

Advantageously, in the method for identifying an electronic cigarette of the present application, a following step is further comprised after the step S3:

S4: the microprocessor outputs a control signal to a switch circuit according to a matching result of the electronic cigarette case and the electronic cigarette; the switch circuit connects or disconnects an electrical connection path between the first interface and the power supply battery, on the basis of the control signal from the microprocessor, so that a charging path between the electronic cigarette case and the electronic cigarette is switched on or switched off.

Advantageously, in the method for identifying an electronic cigarette of the present application, the step S3 further comprises: the microprocessor outputs an indication signal to a status indication circuit according to a matching result of the electronic cigarette case and the electronic cigarette; the status indication circuit outputs a prompt information which is corresponding to a matching status or a non-matching status of the electronic cigarette case and the electronic cigarette, on the basis of the indication signal of the microprocessor.

Advantageously, in the method for identifying an electronic cigarette of the present application, if the identification information generation module in the step S1 outputs the identification information by a wireless transmission mode, a following step is further comprised before the step S1: S01: the identification information generation module prestores the identification information;

if the identification information generation module in the step S1 outputs the identification information by a wired transmission mode, a following step is further comprised before the step S1: S02: a first interface of the electronic cigarette case is electrically connected to a second interface of the electronic cigarette.

Advantageously, in the method for identifying an electronic cigarette of the present application, before the step S2, a following step is further comprised:

S12: a trigger circuit sends a trigger signal to the microprocessor, the microprocessor identifies the electronic cigarette after receiving the trigger signal;

After the step S3, a following step is further comprises:

S4: the microprocessor outputs a control signal to a switch circuit according to a matching result of the electronic cigarette case and the electronic cigarette in step S3; the switch circuit connects or disconnects an electrical connection path between a first interface and a power supply battery, on the basis of the control signal from the microprocessor, so that a charging path between the electronic cigarette case and the electronic cigarette is switched on or switched off;

the step S3 further comprises: the microprocessor outputs an indication signal to a status indication circuit according to a matching result of the electronic cigarette case and the electronic cigarette; the status indication circuit outputs a prompt information which is corresponding to a matching status or a non-matching status of the electronic cigarette case and the electronic cigarette, on the basis of the indication signal of the microprocessor;

if the identification information generation module in the step S1 outputs the identification information by a wireless transmission mode, a following step is further comprised before the step S1: S01: the identification information generation module prestores the identification information;

if the identification information generation module in the step S1 outputs the identification information by a wired transmission mode, a following step is further comprised before the step S1: S02: a first interface of the electronic cigarette case is electrically connected to a second interface of the electronic cigarette.

With application of the electronic cigarette identification device, the electronic cigarette case, and the method for identifying electronic cigarette, the following advantages can be achieved: by providing the microprocessor which is inside the electronic cigarette and being used for identifying, according to a converted identification information, whether the electronic cigarette case and the electronic cigarette match, it is possible to prevent the electronic cigarette case and non-designated electronic cigarette from mixing use. The present invention avoids the problems of being impossible to know whether the electronic cigarette case matches the electronic cigarette before the electronic cigarette case charges the electronic cigarette, and being impossible to stop the charging of the battery rod in the electronic cigarette if there is a mismatch. Therefore, the present invention further avoids problems of shortened life spans, a damaged battery rod or an explosion of the battery rod which are caused by that the charging cannot be stopped when the electronic cigarette case and the electronic cigarette are mismatching, so that it improves safety and reliability for customers when using.

BRIEF DESCRIPTION OF THE DRAWINGS

The present application will be further described with reference to the accompanying drawings and embodiments in the following. Obviously, the following accompanying drawings are only parts of the present application and it is possible for one skilled in the art to obtain other accompanying drawings according to these.

DETAILED DESCRIPTION OF THE PREFERRED EMBODIMENT

In order to solve the drawbacks in the prior art that, it is difficult to know whether the electronic cigarette case matches the electronic cigarette before charging, and the charging cannot be immediately stopped when the electronic cigarette case and the electronic cigarette do not match with each other, the present application provides an electronic cigarette identification device, an electronic cigarette case, and a method for identifying electronic cigarette.

The electronic cigarette identification device of the present invention comprises an electronic cigarette and an electronic cigarette case which can be used to identify the electronic cigarette, the electronic cigarette identify whether an electronic cigarette case matches with an electronic cigarette by providing a microprocessor inside, according to an identification information which is generated by an identification information generation module in the electronic cigarette and received by an identification information receiving module, it is possible to prevent an electronic cigarette case and a non-designated electronic cigarette from mixing use. The present invention avoids the problems of being impossible to know whether the electronic cigarette case matches the electronic cigarette before the electronic cigarette case charges the electronic cigarette, and being impossible to stop the charging of the battery rod in the electronic cigarette if there is a mismatch. Therefore, the present invention further avoids problems of shortened life spans, a damaged battery rod or an explosion of the battery rod which are caused by a situation that the charging cannot be stopped when the electronic cigarette case and the electronic cigarette are mismatching, so that it improves safety and reliability for customers when using.

The example embodiments of the present application will be further described with referencing to the accompanying drawings, to have a clear understanding of the technical features, purposes and effects of the present invention. Obviously, the following example embodiments are only parts of the embodiments of the present application.

Figure 1:
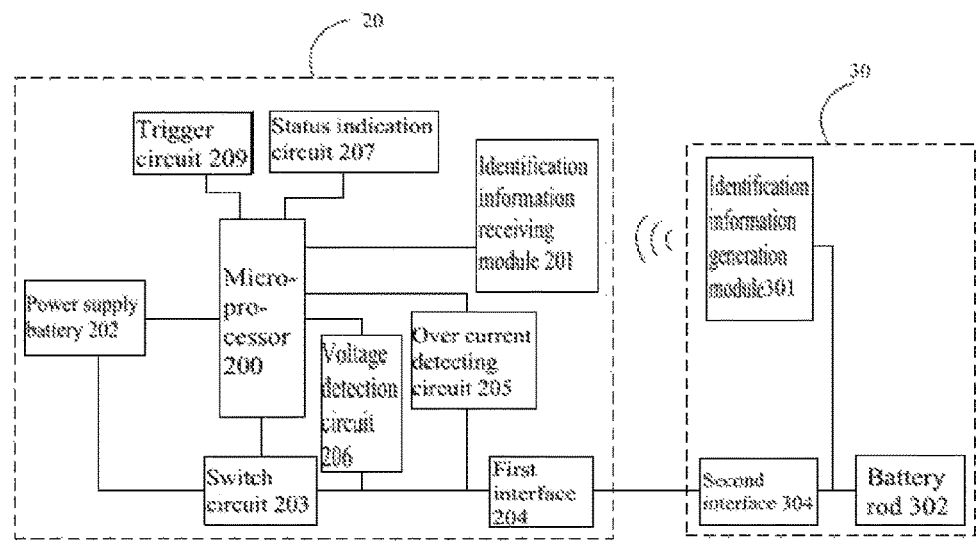
FIG. 1 is a structure block diagram of an electronic cigarette identification device provided by a first embodiment of the present application.
Figure 5:
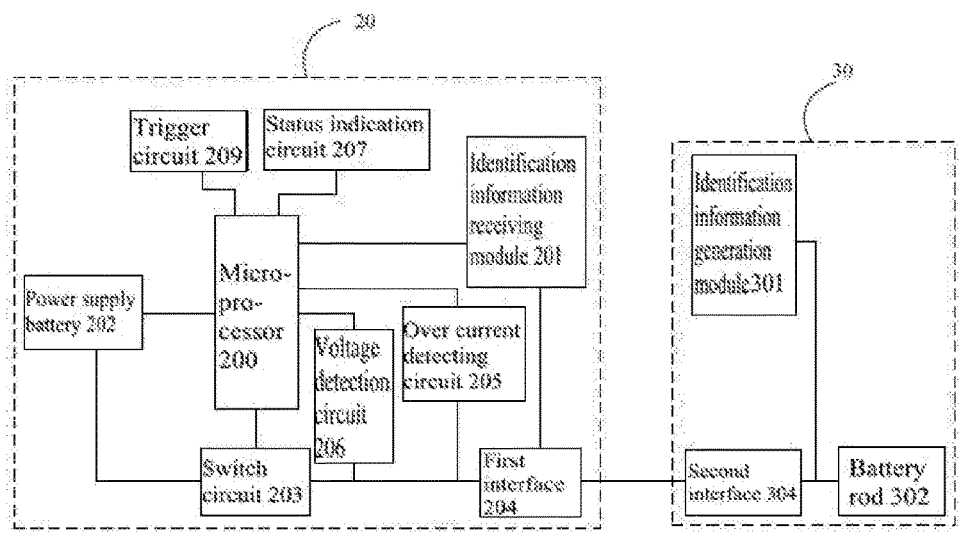
FIG. 5 is a structure block diagram of an electronic cigarette identification device provided by a second embodiment of the present application.

Refer to FIG. 1 which is a structure block diagram of an electronic cigarette identification device provided by a first embodiment of the present application; and FIG. 5 is a structure block diagram of an electronic cigarette identification device provided by a second embodiment of the present application;

An electronic cigarette 30 comprises an identification information generation module 301, and the electronic cigarette case 20 of the present invention comprises a power supply battery 202, a microprocessor 200, and an identification information receiving module 201;

the microprocessor 200 is connected to the power supply battery 202 and the identification information receiving module 201 respectively;

the power supply battery 202 is used to store electrical power and supply voltage; the identification information generation module 301 is used for outputting an identification information to the identification information receiving module 201 by means of wired or wireless transmission; the identification information receiving module 201 is used for receiving the identification information and converting the identification information, then sending to the microprocessor 200; the microprocessor 200 is used for identifying, according to a converted identification information, whether the electronic cigarette case 20 and the electronic cigarette 30 match. Wherein, the electronic cigarette 30 comprises a battery rod assembly and an atomizing assembly, the battery rod assembly comprises a battery rod, the battery rod assembly and the atomizing assembly are a detachable connecting structure or a non-detachably integral structure, when identifying, a whole electronic cigarette can be used to identify or a battery rod can be removed separately to identify.

Wherein, according to the transmission mode of the identification information generation module 301, the following two embodiments are provided.

A First Embodiment of the Present Invention

In the first embodiment of the present invention, the identification information generation module 301 outputs an identification information by a wireless transmission mode, and the identification information generation module 301 needs to prestore the identification information; In the first embodiment, its specific implementation comprises a direct utilization of a tag chip and its matching reader chip, which has been made into finished productions, to achieve wireless signal transmission, or a related circuit designed to produce electromagnetic waves as carrier waves to send the identification information.

Several methods of direct utilizations of a tag chip and its matching reader chip are shown below: the identification information receiving module 201 comprises a RFID reader chip, the identification information generation module 301 comprises a RFID tag chip; or the identification information receiving module 201 comprises a NFC reader chip, the identification information generation module 301 comprises a NFC tag chip; or the identification information receiving module 201 comprises a zigbee reader chip, the identification information generation module 301 comprises a zigbee tag chip. For example, model numbers of the RFID reader chip can be RF69, RF68, U2270B, and so on; a model number of the RFID tag chip can be Monza 4, FM 11RF325H, and so on.

Figure 2:
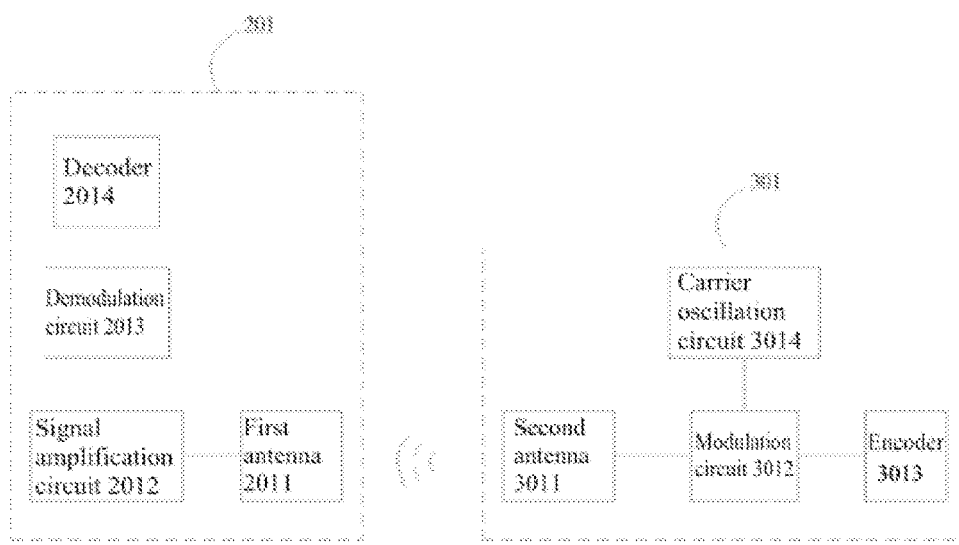
FIG. 2 is a structure block diagram of an identification information receiving module and an identification information generation module provided by a preferred implementation of the first embodiment in FIG. 1 of the present application.

A preferred implementation of the first embodiment selects to utilize a related circuit to produce electromagnetic waves as carrier waves to send the identification information, in combination with FIG. 1, refer to FIG. 2:

Wherein, the identification information generation module 301 comprises an encoder 3013, a modulation circuit 3012, a carrier oscillation circuit 3014 and a second antenna 3011; a wireless identification information receiving module 201 comprises a first antenna 2011, a signal amplification circuit 2012, a demodulation circuit 2013 and a decoder 2014;

the modulation circuit 3012 is connected to the encoder 3013, the carrier oscillation circuit 3014 and the second antenna 3011 respectively; the first antenna 2011, the signal amplification circuit 2012, the demodulation circuit 2013 and the decoder 2014 are connected successively;

the encoder 3013 is used for prestoring and encoding the identification information, the carrier oscillation circuit 3014 is used to generate a carrier wave, the modulation circuit 3012 is used to modulate the identification information encoded by the encoder 3013 into the carrier wave generated by the carrier oscillation circuit 3014, the second antenna 3011 is used for converting the identification information which is modulated into the carrier wave into a radio frequency signal containing the identification information, then outputting the radio frequency signal;

the first antenna 2011 is used to receive the radio frequency signal outputted by the second antenna 3011 and transfer the radio frequency signal into an electrical signal containing the identification information, the signal amplification circuit 2012, the demodulation circuit 2013 and the decoder 2014 are successively used to amplify, demodulate and decode the electrical signal. The decoder 2014 can be used as a decoding chip, for instance, a model number of the decoding chip is pt2272, to realize decoding.

Figure 3:
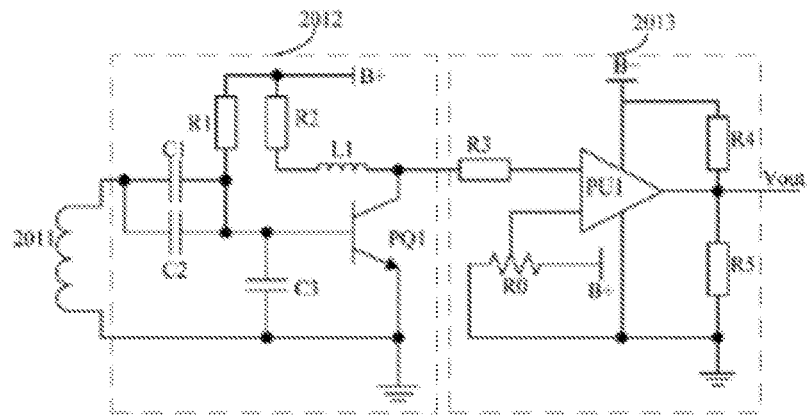
FIG. 3 is a circuit diagram of a signal amplification circuit and a demodulation circuit provided by FIG. 2 of the present application.

Refer to FIG. 3 which is a circuit diagram of a signal amplification circuit and a demodulation circuit provided by FIG. 2 of the present application;

The signal amplification circuit 2012 comprises a first capacitor C1, a second capacitor C2, a third capacitor C3, a first resistance R1, a second resistance R2, a triode PQ1 which is used to realize a signal amplification, and an inductance L1; the demodulation circuit 2013 comprises a third resistance R3, a variable resistance R0, a comparator PU1, a fourth resistance R4 and a fifth resistance R5;

The first capacitor C1 and the second capacitor C2 are connected in parallel, and one terminal of the first capacitor C1 is connected to one terminal of the first antenna 2011, the other terminal of the first antenna 2011 is connected to ground, the other terminal of the first capacitor C1 is connected with a base of the triode PQ1, the base of the triode PQ1 is connected with ground through the third capacitor C3, and is connected with a positive electrode of the power supply battery 202 through the first resistance R1, an emitter of the triode PQ1 is connected to ground, a collector of the transistor PQ1 is connected to a positive electrode of the power supply battery 202 through an inductance L1 and a second resistance R2 successively, a collector of the transistor PQ1 is further connected to an inphase input terminal of the comparator R1 through the third resistance R3, an inverting input terminal of the comparator PU1 is connected with an adjustable terminal of the variable resistance R0, the variable resistance R0, the two fixed terminals of the variable resistor R0 are respectively connected with the positive electrode and the negative electrode of the power supply battery 202; a positive power terminal of the comparator PU1 is connected to the positive electrode of the power supply battery 202, a negative power terminal of the comparator PU1 is connected with ground, an output terminal of the comparator PU1 is connected to the decoder 2014; the output terminal of the comparator PU1 is further connected to the positive electrode of the power supply battery 202 and connected to ground through the fifth resistance R5.

Preferably, the identification information contained in the identification information generation module 301 can be processed an encryption to preventing data copying, and to avoid a situation that the identification information is modified, causing that an unmatched electronic cigarette 30 is mistakenly identified and connected as a matched electronic cigarette 30 with electronic cigarette case 20.

A preferred implementation of the first embodiment, the identification information is an ID information which is an identity identification number, the ID information of different electronic cigarettes are different. The microprocessor (200) prestores the ID information of the electronic cigarette, and compares a prestored ID information with a receiving ID information when the microprocessor (200) receives the ID information which is decoded by the decoder 2014; if the receiving ID information is one of the prestored ID information, then the electronic cigarette 30 is identified to be matched with the electronic cigarette case 20. Besides, the identification can be other kinds of identification information, such as serial numbers and so on, the microprocessor 200 only needs to prestore information which is corresponding to the identification information, then an accurate identification whether electronic cigarette 30 matches with electronic cigarette case 20 can be realized.

In order to facilitate users to manipulate the electronic cigarette case 20 start to identify the electronic cigarette 30, preferably, the electronic cigarette case 20 further comprises a trigger circuit 209 which is connected to the microprocessor 200, the trigger circuit 209 is used for sending a trigger signal to the microprocessor 200, the microprocessor 200 identifies the electronic cigarette 30 after receiving the trigger signal, the microprocessor 200 supplies electrical power to all the electronic cigarettes on all connections when the trigger signal is not received or the microprocessor 200 refuses to supply electrical power to any electronic cigarettes when the trigger signal is not received. Specifically, if users do not start the trigger circuit 209, the electronic cigarette case 20 do not identify any electronic cigarette 30, there are two kinds of power supply design schemes for charging the electronic cigarette 30 by the electronic cigarette case 20: firstly, the electronic cigarette case 20 directly provides electrical power to connected electronic cigarettes 20, which means that, without starting identifying, the electronic cigarette case 20 provides electrical power to the electronic cigarette 20; secondly, the electronic cigarette case 20 refuses to supply electrical power to any electronic cigarettes, including a matched electronic cigarette, which means that, without starting identifying, even though a matched electronic cigarette is refused to be charged; these two kinds of power supply design schemes are controlled by a responding control program which is produced in the microprocessor 200. In the present embodiment, the second pin of the microprocessor 200 is connected to the trigger circuit 209.

Besides, defining of the trigger circuit 209 can save electrical power as well, without the trigger circuit 209, when identifying by a wireless transmission mode, identifying is started automatically as soon as the electronic cigarette 30 enters an induction region of the electronic cigarette case 20, especially for the scheme of a wireless transmission mode that the electronic cigarette 30 can initiatively send the identification information, as long as the electronic cigarette 30 is in the induction region, automatically repeated identifications will be continued, especially for the situation that the electronic cigarette 30 is placed in the electronic cigarette case 20, identifications are automatically repeated, and results in electrical power wasting. By defining the trigger circuit 209, start of identifying can be controlled by need, and save electrical power.

The trigger circuit 209 can be a capacitor switch, a resistance switch, a button switch, and so on, the trigger circuit 209 is preferred to be defined in a charging slot of the electronic cigarette case 20, to achieve that the trigger circuit 209 is triggered when the battery rod of the electronic cigarette 30 is inserted into the charging slot, and to improve customers' experience. For instance, the second pin of the microprocessor 200 can be connected with the positive electrode of the power supply battery 202 through a pull up resistance, the second pin is connected to ground by a button switch, during a normal condition, the second pin is in a high level, and when starting identification, the button switch is pressed, then the second pin pulls down to a low level, thus, two modes for starting an identification are existed in the microprocessor 200 to start an identification: firstly, the microprocessor 200 controls the identification information receiving module 201 in s working status, for example, controls an electrical power supply of the identification information receiving module 201, secondly, the microprocessor 200 receives the identification information which is outputted by the identification information receiving module 201 and identifies, for instance, controls the seventh pin as effective.

Figure 4:
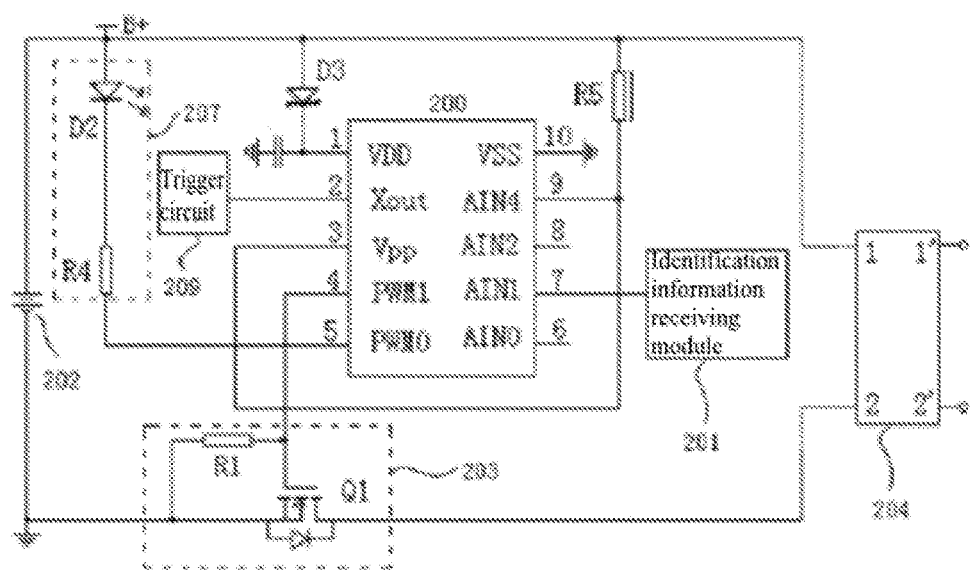
FIG. 4 is a circuit schematic diagram of an electronic cigarette case provided by FIG. 1 of the present application.

After the microprocessor 200 identifying whether the electronic cigarette 30 matches, preferably, relevant measures can be applied, for instance: indicating a identifying result, and disconnecting a charging path of the electronic cigarette when mismatching, referring to FIG. 1 and FIG. 4.

Wherein, the electronic cigarette case 20 further comprises a first interface 204, the electronic cigarette 30 further comprises a second interface 304 which is matched mutually with the first interface 204, and a battery rod 302 which is used to store electrical power for providing the voltage to an atomization of the electronic cigarette 30, the battery rod 302 is connected to the identification information generation module 301 and the second interface 304 respectively, the first interface 204 is connected to the power supply battery 202;

the first interface 204 and the second interface 304 are used to mutually connected with each other to realize an electrical connection between the electronic cigarette 30 and the electronic cigarette case 20, thus to realize that the battery rod 302 can be charged by the power supply battery 202.

In order to disconnect the charging path of the electronic cigarette when the identifying result is mismatching. Preferably, the electronic cigarette case 20 further comprises a switch circuit 203 which is connected with the first interface 204 and the power supply battery 202 respectively;

the microprocessor 200 is also used to output a control signal to the switch circuit 203 according to a matching result of the electronic cigarette case 20 and the electronic cigarette 30; the switch circuit 203 is used to connect or disconnect an electrical connection path between the first interface 204 and the power supply battery 202, on the basis of the control signal from the microprocessor 200, so that a charging path between the electronic cigarette case 20 and the electronic cigarette 30 is switched on or switched off.

Specifically, the switch circuit 203 comprises a MOS tube Q1, a model number of the microprocessor 200 is SN8P2711; wherein, the fourth pin of the microprocessor 200 is connected to a grid of the MOS tube Q1, a source electrode of the MOS tube Q1 is connected to the negative electrode of power supply battery 202, a drain electrode of the MOS tube Q1 is connected to the first interface 204.

In order to indicate the identifying result, preferably, the electronic cigarette case 20 further comprises a status indication circuit 207 which is connected to the microprocessor 200;

the microprocessor 200 is also used to output an indication signal to the status indication circuit 207 according to a matching result of the electronic cigarette case 20 and the electronic cigarette 30; the status indication circuit 207 is used to output a prompt information which is corresponding to a matching status or a non-matching status of the electronic cigarette case 20 and the electronic cigarette 30, on the basis of the indication signal of the microprocessor 200.

Specifically, the status indication circuit 207 comprises a light emitting diode D2, a model number of the microprocessor 200 is SN8P2711; the fifth pin of the microprocessor 200 is connected to a cathode of the light emitting diode D2; an anode of the light emitting diode D2 is connected to the positive electrode of the power supply battery 202.

If the power supply battery 202 continues to supply electrical power when its voltage is too low, the battery life will be affected, also a normal charge for the electronic cigarette cannot be achieved. When the electronic cigarette has already been fully charged, it is unfavorable for the components and parts inside the electronic cigarette case and the electronic cigarette if charging is continued. Therefore, in order to further protect the power supply battery 202, preferably, the electronic cigarette case 20 further comprises a voltage detection circuit 206 and an over current detecting circuit 205;

The voltage detection circuit 206 is connected to the power supply battery 202 and the microprocessor 200 respectively; the over current detecting circuit 205 is connected to the first interface 204 and the microprocessor 200, for example, in the present embodiment, the voltage detection circuit 206 and the over current detecting circuit 205 are connected to the sixth pin and the eighth pin of the microprocessor 200 respectively.

The voltage detection circuit 206 is used to detect a charging voltage of the battery rod 302 which is outputted from the power supply battery 202, the over current detecting circuit 205 is used to detect a charging current outputted by the first interface 204, the microprocessor 200 is also used to control the switch circuit 203 to disconnect when the charging voltage is too low or the charging current is over current, or stop charging the battery rod 302 when the charging current is too small to close to zero, which means that the battery rod 302 is in a fully charged status, the microprocessor 200 is also used for controlling a conduction time of the switch circuit 203 according to the charging voltage detected in real-time by the voltage detection circuit 206.

A work principle that the electronic cigarette identification device identifies by the wireless transmission mode is as follows:

Start the trigger circuit 209, the trigger circuit 209 outputs a trigger signal to the second pin of the microprocessor 200, the microprocessor 200 control the seventh pin effective after receiving the trigger signal.

When the electronic cigarette 30 enters a signal coverage area of the first antenna 2011 of the identification information receiving module 201 of the electronic cigarette case 20, the second antenna 3011 of the identification information generation module 301 inside the electronic cigarette 30 receives an electromagnetic wave which is outputted by the first antenna 2011 of the identification information receiving module 201, and converting the electromagnetic wave into a electrical power to drive the identification information generation module 301 to encode the prestored identification information and output by the second antenna 3011 after modulating; the first antenna 2011 of the identification information receiving module 201 receives a signal containing the identification information, and outputs to the microprocessor 200 through the seventh pin after amplifying, demodulating and decoding the electrical signal. The microprocessor 200 identifies whether the electronic cigarette 30 matches with the electronic cigarette case 20 on the basis of a received information. After the microprocessor 200 identifying a matching result:

On one hand, the microprocessor 200 can control the light emitting diode D2 to light or not to light for indicating by controlling a voltage of the fifth pin, or to control a luminous intensity or a luminous state of the light emitting diode D2, for instance, flashing, keeping bright, to indicate a status of matching or mismatching.

On the other hand, if the identifying result of the microprocessor 200 is that the electronic cigarette 30 and the electronic cigarette 20 are matching, then the microprocessor 200 controls the MOS tube Q1 to be conductive, to switch on the charging path of the electronic cigarette 30, the power supply battery 202 charges the battery rod 302 in the electronic cigarette 30. If the identifying result of the microprocessor 200 is that the electronic cigarette 30 and the electronic cigarette 20 are mismatching, then the microprocessor 200 controls the MOS tube Q1 to be disconnected, to switch off the charging path, to avoid a failure occurs on a mismatching electronic cigarette 30.

Besides, after matching, in the process of charging, the voltage detection circuit 206 detects the charging voltage in real-time which is outputted to the battery rod 302 and transmits the microprocessor 200, the microprocessor 200 controls the MOS tube Q1 to be connected or disconnected by controlling a PWM pulse which has an adjustable duty cycle and is outputted by the fourth pin based on the charging voltage, so as to realize the feedback regulation of the charging voltage for charging management of the battery rod 302. When a too low charging voltage is detected by the voltage detection circuit 206 or an over charging current or a charging current which is close to zero is detected by the over current detecting circuit 205, the MOS tube Q1 is controlled to be disconnected, to stop charging. Moreover, the microprocessor 200 can realize a short circuit protection by detecting a voltage change of the ninth pin: if the short circuit occurs, the voltage detected on the ninth pin has a mutation with a sudden rise in voltage, then the fourth pin of the microprocessor 200 is in a low level to disconnect the MOS tube Q1, so as to stop charging and to realize a short circuit protection. During charging, function of the light emitting diode D2 can be switched from indicating a matching status to indicating a working state, for instance, indicating for abnormal working conditions, including: a short circuit, a low voltage of battery, and so on; or to indicate a normal charge condition and a fully charged status.

Understandably, the MOS tube in the present invention can be replaced by a triode, a transistor, and a thyristor to realize the same function, the status indication circuit 207 can be realized with a buzzer or a voice prompting circuit, do not limit here, single chip models can also be replaced with other single model or MCU generation which has similar functions, these substitutions are also within scopes of the protection of the present invention.

A Second Embodiment of the Present Invention

Figure 6:
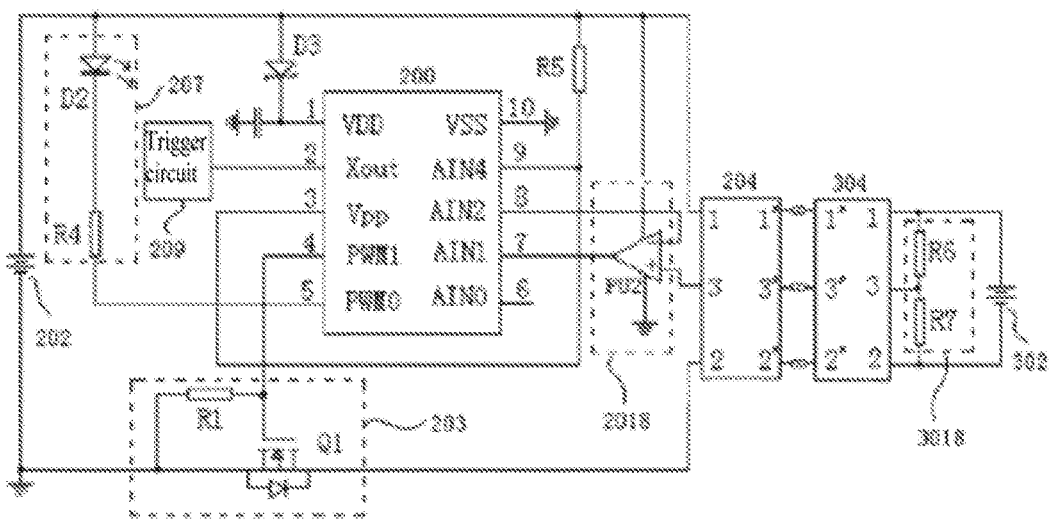
FIG. 6 is a circuit schematic diagram of a preferred implementation of FIG. 5 of the present invention.

A difference between the second embodiment and the first embodiment is that the identification information generation module 301 outputs the identification information by a wired transmission mode, referring to FIG. 5 and FIG. 6;

the identification information generation module 301 comprises a voltage dividing circuit 3018; the identification information receiving module 201 comprises a voltage comparison circuit 2018; the electronic cigarette case 20 further comprises a first interface 204, the electronic cigarette 30 further comprises a second interface 304 which is matched mutually with the first interface 204;

the voltage dividing circuit 3018 is connected to the second interface 304; the voltage comparison circuit 2018 and the power supply battery 202 are connected to the first interface 204 respectively;

the first interface 204 and the second interface 304 are connected mutually to realize an electrical connection between the electronic cigarette 30 and the electronic cigarette case 20, the voltage dividing circuit 3018 is used to connect with the power supply battery 202 through the second interface 304 and the first interface 204 when the second interface 304 is connected with the first interface 204, and a voltage through the second interface 304 and the first interface 204 is outputted as the identification information; the voltage comparison circuit 2018 is used to receive the voltage and compare the voltage with a predetermined voltage, then output a comparison information to the microprocessor 200.

A different between the present embodiment and the first embodiment is that: a configuration of the first interface 204 is different from that of the second interface 304, the identification information generation module 301 is different from the identification information receiving module 201, thus only the configurations of these two components are explained below.

Specifically, the first interface 204 and the second interface 304 both comprise power supply anode connection terminals (1 and 1' in FIG. 6), power supply cathode connection terminals (2 and 2' in FIG. 6) and identification information connection terminals (3 and 3' in FIG. 6), compared to ordinary interface (such as the first interface 204 in FIG. 4, only comprises 1 and 1', 2 and 2'), identification information connection terminals are must added to these two interfaces, as the wired transmission mode between the identification information generation module 301 and the identification information receiving module 201 is realized by the identification information connection terminals.

Wherein, the voltage dividing circuit 3018 comprises a first divider resistance R6 and a second divider resistance R7; the voltage comparison circuit 2018 comprises a comparator PU2;

a power supply anode connection terminal of the first interface 204 is connected to a positive electrode of the power supply battery 202, a power supply cathode connection terminal of the first interface 204 is connected to a negative electrode of the power supply battery 202, an identification information connection terminal of the first interface 204 is connected to an inphase input terminal of the comparator PU2, an inverting input terminal of a comparator PU2 is connected with the eighth pin of the microprocessor 200, a positive power terminal of the comparator PU2 is connected to the positive electrode of the power supply battery 202, a negative power terminal of the comparator PU2 is connected to ground, an output terminal of the comparator PU2 is connected to the seventh pin of the microprocessor 200; one terminal of the first divider resistance R6 is connected to a power supply anode connection terminal of the second interface 304, and the other terminal of the first divider resistance R6 is connected to one terminal of the second divider resistance R7 and an identification information connection terminal of the second interface 304, the other terminal of the second divider resistance R7 is connected to a power supply cathode connection terminal of the second interface 304.

A voltage which is outputted from the eighth pin of the microprocessor 200 is a predetermined reference voltage of the microprocessor 200, if a voltage which is outputted from the voltage dividing circuit 3018 in the electronic cigarette 30 is equal to the predetermined reference voltage, then the output terminal of the comparator PU2 outputs 0. Therefore, the microprocessor 200 identifies whether the electronic cigarette matches based on whether a voltage which is received by the seventh is 0; if it is 0, then the electronic cigarette 30 matches with the electronic cigarette case 20, otherwise, they are mismatching.

Actually, as the cause of the component itself or the signal transmission in the circuit, a little error occurs, two input terminals of the comparator PU2 are not absolutely equal to each other, if a voltage which is outputted from the voltage dividing circuit 3018 in the electronic cigarette 30 is smaller than the predetermined reference voltage, then the output terminal of the comparator PU2 outputs a low potential, if a voltage which is outputted from the voltage dividing circuit 3018 in the electronic cigarette 30 is larger than the predetermined reference voltage, then the output terminal of the comparator PU2 outputs a high potential. Therefore, comparison can be accomplished in a certain range that contains the predetermined voltage, the eighth pin outputs two end values of the certain range successively, for example, the predetermined voltage is 3 v, the certain range is defined as 2.95-3.05 v, firstly, the eighth pin outputs 2.95 v, an output signal which is outputted from the output terminal of the comparator PU2 and received by the seventh pin is collected, then the eighth pin outputs 3.05 v, an output signal which is outputted from the output terminal of the comparator PU2 and received by the seventh pin is collected, if signals which are collected successively are a high potential and a low potential respectively, then the electronic cigarette 30 is identified to be matched with the electronic cigarette case 20, otherwise they are mismatching.

It is worth noting that, for the output of the identification information through the wired transmission mode, the identification information receiving module 201 can be canceled, the identification information generation module 301 can directly output the identification information to the microprocessor 200, the seventh pin of the microprocessor 200 directly detects a specific voltage outputted by the voltage dividing circuit 3018, then identifies based on its internal program.

A working principle of the wired transmission mode is shown below:

Start the trigger circuit 209, referring to the part of the wireless transmission mode;

Connect the second interface 304 of the electronic cigarette 30 to the first interface 204 of the electronic cigarette case, meanwhile, the voltage dividing circuit 3018 is connected with the power supply battery 202 in the electronic cigarette case 20 through the second interface 304 and the first interface 204, which means that the first divider resistance R6 and the second divider resistance R7 are connected to the positive electrode and the negative electrode of the power supply battery 202, a connection node of the first divider resistance R6 and the second divider resistance R7 is connected with the inphase input terminal of the comparator PU2 through an identification information connection terminal, that is, a drop voltage of the second divider resistance R7 is outputted to the inphase terminal of the comparator PU2, meanwhile, the inverting input terminal of the comparator PU2 receives a predetermined voltage which is outputted from the eighth pin of the microprocessor 200, if voltage which are outputted to the input terminals are equal to each other, then the output terminal of the comparator PU2 outputs 0, a voltage which is received by the seventh pin of the microprocessor 200 is 0, thus, the microprocessor 200 identifies the electronic cigarette matches with the electronic cigarette case 20; otherwise, if voltage which are outputted to the input terminals are not equal to each other, then a voltage which is received by the seventh pin of the microprocessor 200 is not 0, thus, the microprocessor 200 identifies the electronic cigarette mismatches with the electronic cigarette case 20.

With reference to the above-mentioned wireless transmission mode, the control work of the microprocessor 200 on identifying matching or after matching is not repeated herein.

With application of the electronic cigarette identification device, the following advantages can be achieved: the electronic cigarette case can be used for identifying whether the electronic cigarette case and the electronic cigarette match, it is possible to prevent the electronic cigarette case and non-designated electronic cigarette from mixing use. The present invention avoids the problems of being impossible to know whether the electronic cigarette case matches the electronic cigarette before the electronic cigarette case charges the electronic cigarette, and being impossible to stop the charging of the battery rod in the electronic cigarette if there is a mismatch. Therefore, the present invention further avoids problems of shortened life spans, a damaged battery rod or an explosion of the battery rod which are caused by that the charging cannot be stopped when the electronic cigarette case and the electronic cigarette are mismatching, so that it improves safety and reliability for customers when using.

Figure 7:
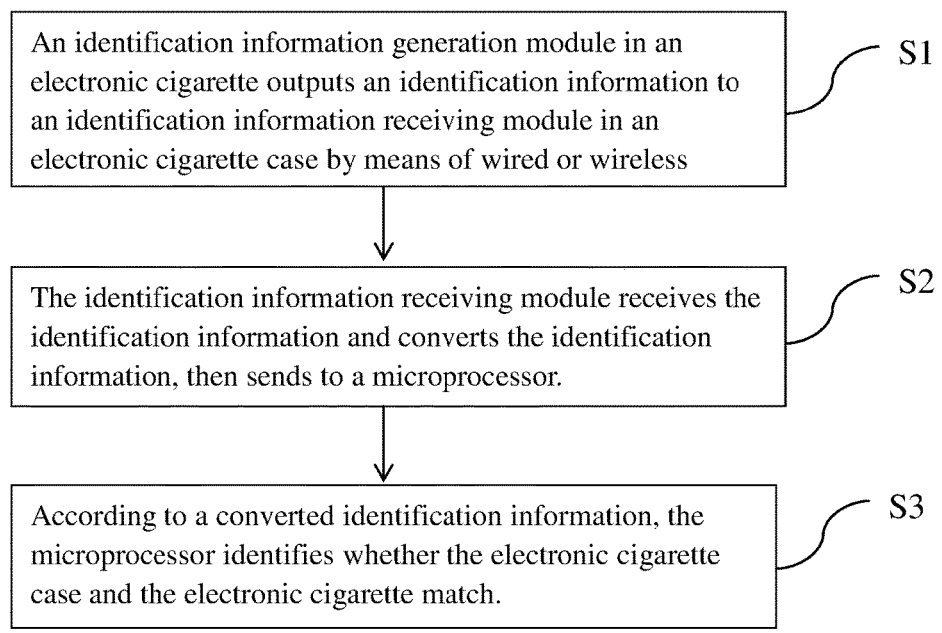
FIG. 7 is a flow diagram of a method for identifying an electronic cigarette provided by the present application.

As shown in FIG. 7, a flow diagram of a method for identifying an electronic cigarette provided by the present application, using to identify an electronic cigarette 30 by an electronic cigarette case 20, the method comprises following steps:

S1: an identification information generation module 301 in the electronic cigarette 30 outputs an identification information to an identification information receiving module 201 in the electronic cigarette case 20 by means of wired or wireless transmission;

S2: the identification information receiving module 201 receives the identification information and converts the identification information, then sends to the microprocessor 200;

S3: according to a converted identification information, the microprocessor 200 identifies whether the electronic cigarette case (20) and the electronic cigarette (30) match.

With application of the method for identifying an electronic cigarette, the following advantages can be achieved: by providing the microprocessor which is inside the electronic cigarette and being used for identifying, according to a converted identification information, whether the electronic cigarette case and the electronic cigarette match, it is possible to prevent the electronic cigarette case and non-designated electronic cigarette from mixing use. The present invention avoids the problems of being impossible to know whether the electronic cigarette case matches the electronic cigarette before the electronic cigarette case charges the electronic cigarette, and being impossible to stop the charging of the battery rod in the electronic cigarette if there is a mismatch. Therefore, the present invention further avoids problems of shortened life spans, a damaged battery rod or an explosion of the battery rod which are caused by that the charging cannot be stopped when the electronic cigarette case and the electronic cigarette are mismatching, so that it improves safety and reliability for customers when using.

Figure 8:
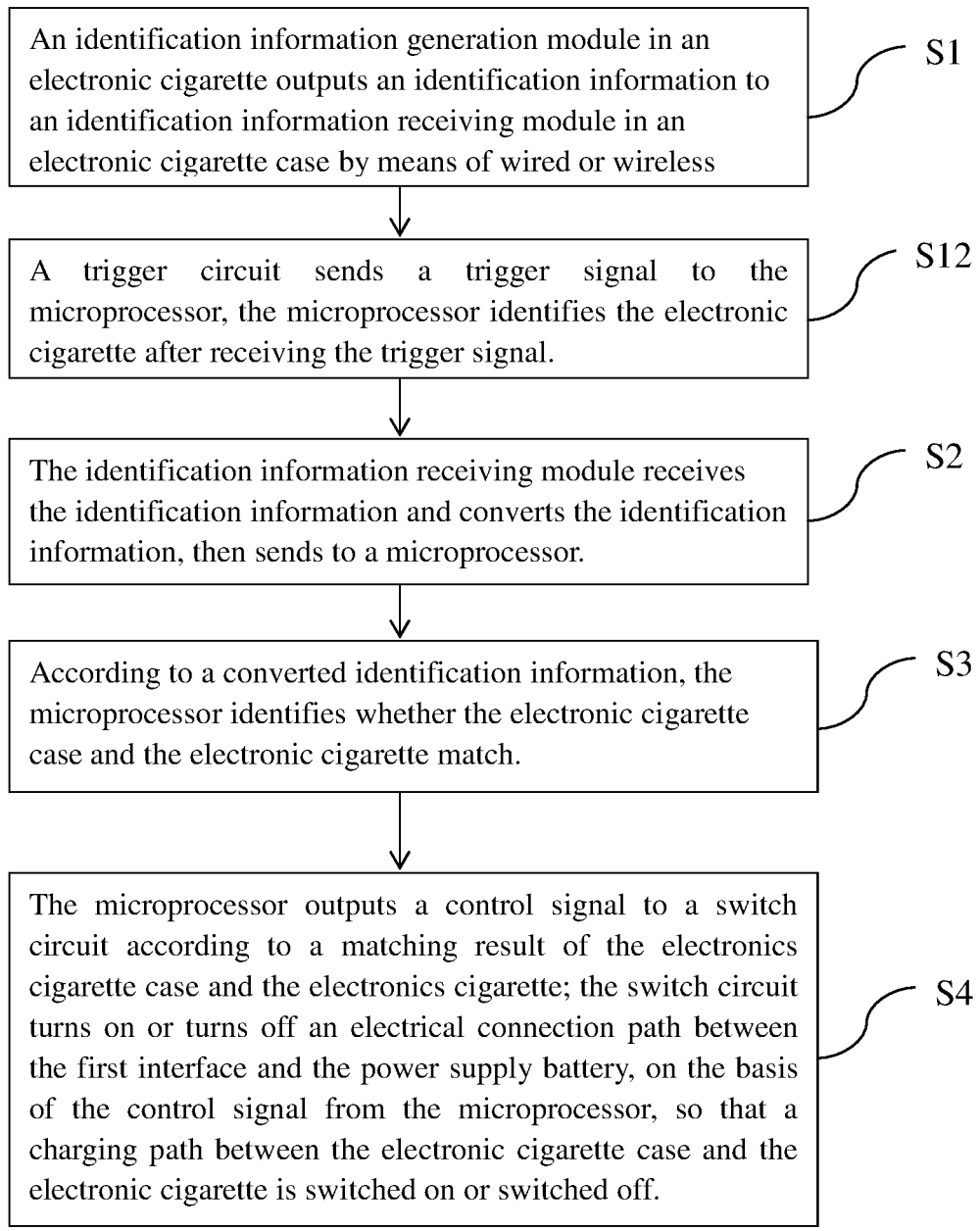
FIG. 8 is a flow diagram of a method for identifying an electronic cigarette provided by a first embodiment of the present application.

Refer to FIG. 8 which is a flow diagram of a method for identifying an electronic cigarette provided by a first embodiment of the present application; preferably, a following step is further comprised before the step S2:

a trigger circuit 209 sends a trigger signal to the microprocessor 200, the microprocessor 200 identifies the electronic cigarette 30 after receiving the trigger signal.

Preferably, a following step is further comprised after the step S3:

S4: the microprocessor 200 outputs a control signal to a switch circuit 203 according to a matching result of the electronic cigarette case 20 and the electronic cigarette 30; the switch circuit 203 connects or disconnects an electrical connection path between the first interface 204 and the power supply battery 202, on the basis of the control signal from the microprocessor 200, so that a charging path between the electronic cigarette case 20 and the electronic cigarette 30 is switched on or switched off.

Figure 9:
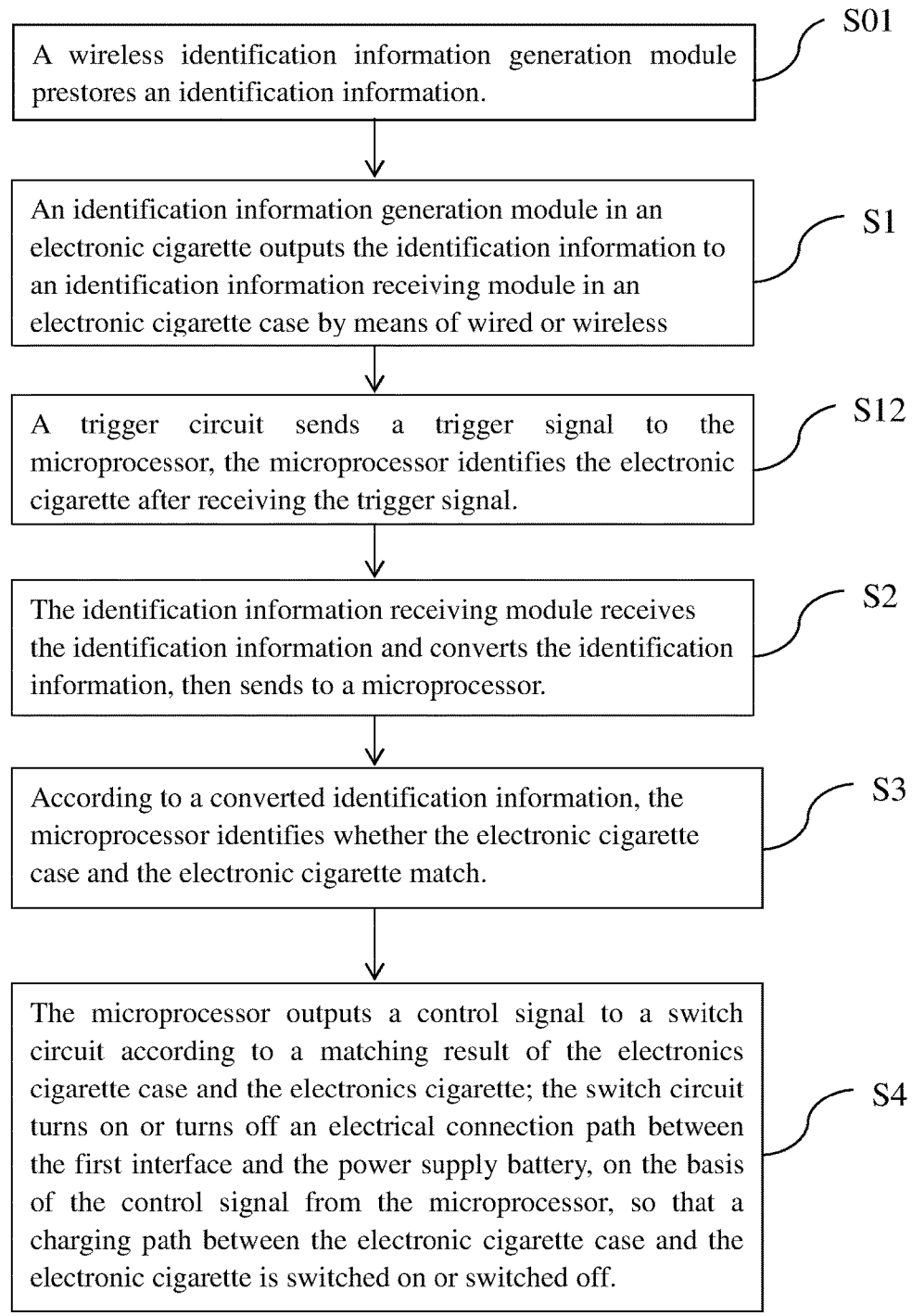
FIG. 9 is a flow diagram of a method for identifying an electronic cigarette provided by a second embodiment of the present application.
Figure 10:
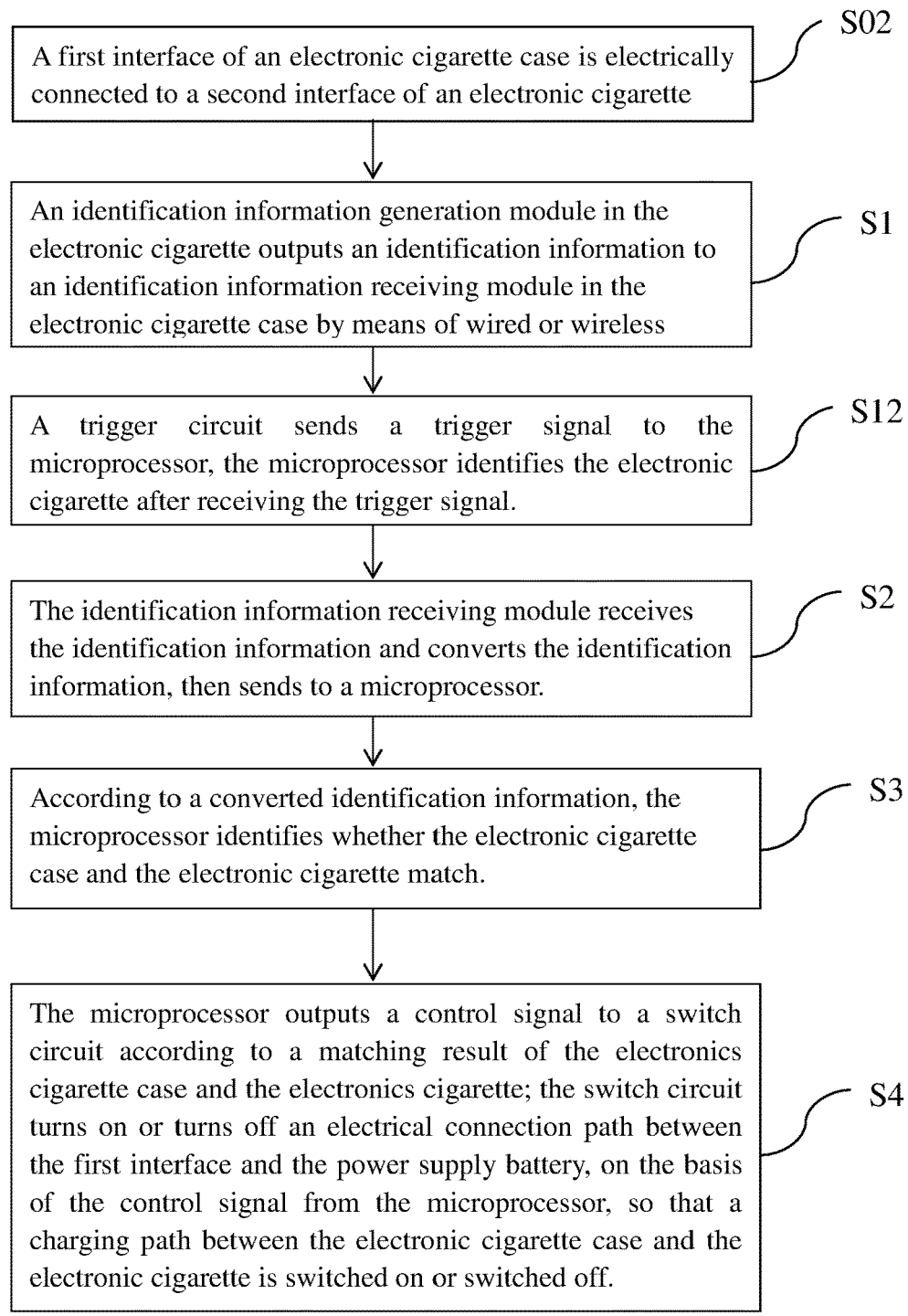
FIG. 10 is a flow diagram of a method for identifying an electronic cigarette provided by a third embodiment of the present application.

Refer to FIG. 9 which is a flow diagram of a method for identifying an electronic cigarette provided by a second embodiment of the present application;

if the identification information generation module 301 in the step S1 outputs the identification information by a wireless transmission mode, a following step is further comprised before the step S1:

S01: the identification information generation module 301 prestores the identification information;

Refer to FIG. 10 which is a flow diagram of a method for identifying an electronic cigarette provided by a third embodiment of the present application;

if the identification information generation module 301 in the step S1 outputs the identification information by a wired transmission mode, a following step is further comprised before the step S1:

S02: a first interface 204 of the electronic cigarette case 20 is electrically connected to a second interface 304 of the electronic cigarette 30.

In general, the electronic cigarette identifies whether an electronic cigarette case matches with an electronic cigarette by providing a microprocessor inside the electronic cigarette case, according to an identification information which is generated by an identification information generation module in the electronic cigarette and received by an identification information receiving module, it is possible to prevent an electronic cigarette case and a non-designated electronic cigarette from mixing use. The present invention avoids the problems of being impossible to know whether the electronic cigarette case matches the electronic cigarette before the electronic cigarette case charges the electronic cigarette, and being impossible to stop the charging of the battery rod in the electronic cigarette if there is a mismatch. Therefore, the present invention further avoids problems of shortened life spans, a damaged battery rod or an explosion of the battery rod which are caused by a situation that the charging cannot be stopped when the electronic cigarette case and the electronic cigarette are mismatching, so that it improves safety and reliability for customers when using. Besides, the identification information can be outputted by means of a wired or a wireless transmission which makes it is very flexible to output identification information.

Above illustrated embodiments of the present invention with attached figures, which are only some preferable embodiments of the present invention, cannot be utilized to limit the claim scope of the present invention. The specific implementation of the above is only schematic, rather than restrictive. It should be understood that, in the inspiration of the present application, those skilled in the art who appreciate and realize all or part of the process in above embodiments may make many modifications or alternatives, without going beyond the purpose and the scope the claims intend to protect of the present application. All these belong to the protection of the present application.

The invention claimed is:

1. An electronic cigarette identification device, comprising an electronic cigarette (30) and an electronic cigarette case (20) for identifying the electronic cigarette (30), wherein, the electronic cigarette (30) comprises an identification information generation module (301), and the electronic cigarette case (20) comprises a power supply battery (202), a microprocessor (200), and an identification information receiving module (201);

the microprocessor (200) is connected to the power supply battery (202) and the identification information receiving module (201) respectively;

the power supply battery (202) is used to store electrical power and provide a voltage;

the identification information generation module (301) is used for outputting an identification information to the identification information receiving module (201) by means of wired or wireless transmission;

the identification information receiving module (201) is used for receiving the identification information and converting the identification information, then sending to the microprocessor (200);

the microprocessor (200) is used for identifying, according to a converted identification information, whether the electronic cigarette case (20) and the electronic cigarette (30) match;

wherein the electronic cigarette case (20) further comprises:

a status indication circuit (207) which is connected to the microprocessor (200); the microprocessor (200) is also used to output an indication signal to the status indication circuit (207) according to a matching result of the electronic cigarette case (20) and the electronic cigarette (30); and the status indication circuit (207) is used to output a prompt information which is corresponding to a matching status or a non-matching status of the electronic cigarette case (20) and the electronic cigarette (30), on the basis of the indication signal of the microprocessor (200).

2. The electronic cigarette identification device according to claim 1, wherein the electronic cigarette case (20) further comprises a trigger circuit (209) which is connected to the microprocessor (200), the trigger circuit (209) is used for sending a trigger signal to the microprocessor (200), the microprocessor (200) is also used for identifying the electronic cigarette (30) after receiving the trigger signal.

3. The electronic cigarette identification device according to claim 1, wherein the identification information generation module (301) outputs the identification information to the identification information receiving module (201) by a wireless transmission mode, the identification information generation module (301) is also used for prestoring the identification information;

the identification information receiving module (201) comprises a RFID reader chip, the identification information generation module (301) comprises a RFID tag chip;

or the identification information receiving module (201) comprises a NFC reader chip, the identification information generation module (301) comprises a NFC tag chip;

or the identification information receiving module (201) comprises a zigbee reader chip, the identification information generation module (301) comprises a zigbee tag chip.

4. The electronic cigarette identification device according to claim 1, wherein the identification information generation module (301) outputs the identification information to the identification information receiving module (201) by a wireless transmission mode, the identification information generation module (301) is also used for prestoring the identification information;

wherein the identification information generation module (301) comprises an encoder (3013), a modulation circuit (3012), a carrier oscillation circuit (3014) and a second antenna (3011); the identification information receiving module (201) comprises a first antenna (2011), a signal amplification circuit (2012), a demodulation circuit (2013) and a decoder (2014); the modulation circuit (3012) is connected to the encoder (3013), the carrier oscillation circuit (3014) and the second antenna (3011) respectively; the first antenna (2011), the signal amplification circuit (2012), the demodulation circuit (2013) and the decoder (2014) are connected successively;

the encoder (3013) is used for prestoring and encoding the identification information, the carrier oscillation circuit (3014) is used to generate a carrier wave, the modulation circuit (3012) is used to modulate the identification information encoded by the encoder (3013) into the carrier wave generated by the carrier oscillation circuit (3014), the second antenna (3011) is used for converting the identification information which is modulated into the carrier wave into a radio frequency signal containing the identification information, then outputting the radio frequency signal; and the first antenna (2011) is used to receive the radio frequency signal outputted by the second antenna (3011) and transfer the radio frequency signal into an electrical signal containing the identification information, the signal amplification circuit (2012), the demodulation circuit (2013) and the decoder (2014) are successively used to amplify, demodulate and decode the electrical signal.

5. The electronic cigarette identification device according to claim 1, wherein the identification information generation module (301) outputs the identification information to the identification information receiving module (201) by a wired transmission mode;

the identification information generation module (301) comprises a voltage dividing circuit (3018); the identification information receiving module (201) comprises a voltage comparison circuit (2018); the electronic cigarette case (20) further comprises a first interface (204), the electronic cigarette (30) further comprises a second interface (304) which is matched mutually with the first interface (204); the voltage dividing circuit (3018) is connected to the second interface (304); the voltage comparison circuit (2018) and the power supply battery (202) are connected to the first interface (204) respectively;

the first interface (204) and the second interface (304) are connected mutually to realize an electrical connection between the electronic cigarette (30) and the electronic cigarette case (20), the voltage dividing circuit (3018) is used to connect with the power supply battery (202) through the second interface (304) and the first interface (204) when the second interface (304) is connected with the first interface (204), and then the voltage dividing circuit (3018) is used to output a voltage through the second interface (304) and the first interface (204) as the identification information; the voltage comparison circuit (2018) is used to receive the voltage and compare the voltage with a predetermined voltage, then output a comparison information to the microprocessor (200).

6. The electronic cigarette identification device according to claim 5, wherein the first interface (204) and the second interface (304) both comprise power supply anode connection terminals, power supply cathode connection terminals and identification information connection terminals;
the voltage dividing circuit (3018) comprises a first divider resistance (R6) and a second divider resistance (R7); the voltage comparison circuit (2018) comprises a comparator (PU2); and
a power supply anode connection terminal of the first interface (204) is connected to a positive electrode of the power supply battery (202), a power supply cathode connection terminal of the first interface (204) is connected to a negative electrode of the power supply battery (202), an identification information connection terminal of the first interface (204) is connected to an inphase input terminal of the comparator (PU2), an inverting input terminal of a comparator (PU2) is connected with the eighth pin of the microprocessor (200), a positive power terminal of the comparator (PU2) is connected to the positive electrode of the power supply battery (202), a negative power terminal of the comparator (PU2) is connected to ground, an output terminal of the comparator (PU2) is connected to the seventh pin of the microprocessor (200); one terminal of the first divider resistance (R6) is connected to a power supply anode connection terminal of the second interface (304), and the other terminal of the first divider resistance (R6) is connected to one terminal of the second divider resistance (R7) and an identification information connection terminal of the second interface (304), the other terminal of the second divider resistance (R7) is connected to a power supply cathode connection terminal of the second interface (304).

7. The electronic cigarette identification device according to claim 1, wherein the electronic cigarette case (20) further comprises a first interface (204), the electronic cigarette (30) further comprises a second interface (304) which is matched mutually with the first interface (204), and a battery rod (302) which is used to store electrical power for providing the voltage to an atomization of the electronic cigarette (30), the battery rod (302) is connected to the identification information generation module (301) and the second interface (304) respectively, the first interface (204) is connected to the power supply battery (202); and
the first interface (204) and the second interface (304) is used to mutually connected with each other to realize an electrical connection between the electronic cigarette (30) and the electronic cigarette case (20), thus to realize that the battery rod (302) can be charged by the power supply battery (202).

8. The electronic cigarette identification device according to claim 7, wherein the electronic cigarette case (20) further comprises a switch circuit (203) which is connected with the first interface (204) and the power supply battery (202) respectively;
the microprocessor (200) is also used to output a control signal to the switch circuit (203) according to a matching result of the electronic cigarette case (20) and the electronic cigarette (30); the switch circuit (203) is used to connect or disconnect an electrical connection path between the first interface (204) and the power supply battery (202), on the basis of the control signal from the microprocessor (200), so that a charging path between the electronic cigarette case (20) and the electronic cigarette (30) is switched on or switched off.

9. The electronic cigarette identification device according to claim 8, wherein the switch circuit (203) comprises a MOS tube (Q1);
wherein the fourth pin of the microprocessor (200) is connected to a grid of the MOS tube (Q1), a source electrode of the MOS tube (Q1) is connected to a negative electrode of power supply battery (202), a drain electrode of the MOS tube (Q1) is connected to the first interface (204).

10. The electronic cigarette identification device according to claim 1, wherein the status indication circuit (207) comprises a light emitting diode (D2);
the fifth pin of the microprocessor (200) is connected to a cathode of the light emitting diode (D2); an anode of the light emitting diode (D2) is connected to a positive electrode of the power supply battery (202).

11. The electronic cigarette identification device according to claim 1, wherein the electronic cigarette case (20) further comprises a first interface (204), a trigger circuit (209) and a switch circuit (203); the electronic cigarette (30) further comprises a second interface (304) which is matched mutually with the first interface (204), and a battery rod (302) which is used to store electrical power and to provide a voltage to an atomization of the electronic cigarette (30), the first interface (204), the switch circuit (203) and the power supply battery (202) are connected successively, the switch circuit (203) and the trigger circuit (209) are connected to the microprocessor (200) respectively; the battery rod (302) is connected to the identification information generation module (301) and the second interface (304) respectively,
the trigger circuit (209) is used for sending a trigger signal to the microprocessor (200), the microprocessor (200) is also used for identifying the electronic cigarette (30) after receiving the trigger signal;
the first interface (204) and the second interface (304) is used to mutually connected with each other to realize an electrical connection between the electronic cigarette (30) and the electronic cigarette case (20), thus to realize that the battery rod (302) can be charged by the power supply battery (202); and
the microprocessor (200) is also used to output a control signal to the switch circuit (203) according to the matching result of the electronic cigarette case (20) and the electronic cigarette (30); the switch circuit (203) is used to connect or disconnect an electrical connection path between the first interface (204) and the power supply battery (202), on the basis of the control signal from the microprocessor (200), so that a charging path between the electronic cigarette case (20) and the electronic cigarette (30) is switched on or switched off.

12. An electronic cigarette case, enabling an identification of an electronic cigarette (30), the electronic cigarette (30) outputs an identification information to the electronic cigarette case by means of wired or wireless transmission, wherein, the electronic cigarette case comprises a power supply battery (202), a microprocessor (200), and an identification information receiving module (201);

the microprocessor (200) is connected to the power supply battery (202) and the identification information receiving module (201) respectively;

the power supply battery (202) is used to store electrical power and provide a voltage;

the identification information receiving module (201) is used for receiving identification information and converting the identification information, then sending to the microprocessor (200);

the microprocessor (200) is used for identifying, according to a converted identification information, whether the electronic cigarette case (20) and the electronic cigarette (30) match;

wherein the electronic cigarette case (20) further comprises a status indication circuit (207) which is connected to the microprocessor (200);

the microprocessor (200) is also used to output an indication signal to the status indication circuit (207) according to a matching result of the electronic cigarette case (20) and the electronic cigarette (30); the status indication circuit (207) is used to output a prompt information which is corresponding to a matching status or a non-matching status of the electronic cigarette case (20) and the electronic cigarette (30), on the basis of the indication signal of the microprocessor (200).

13. The electronic cigarette case according to claim 12, wherein, the electronic cigarette case (20) further comprises a trigger circuit (209) which is connected to the microprocessor (200), the trigger circuit (209) is used for sending trigger signal to the microprocessor (200), the microprocessor (200) is also used for identifying the electronic cigarette (30) after receiving the trigger signal.

14. A method for identifying an electronic cigarette which is used for identifying the electronic cigarette (30) by an electronic cigarette case (20), wherein, the method comprises the following steps:

S1: an identification information generation module (301) in the electronic cigarette (30) outputs an identification information to an identification information receiving module (201) in the electronic cigarette case (20) by means of wired or wireless transmission;

S2: the identification information receiving module (201) receives the identification information and converts the identification information, then sends to a microprocessor (200);

S3: according to a converted identification information, the microprocessor (200) identifies whether the electronic cigarette case (20) and the electronic cigarette (30) match;

wherein the step S3 further comprises: the microprocessor (200) outputs an indication signal to a status indication circuit (207) according to a matching result of the electronic cigarette case (20) and the electronic cigarette (30); the status indication circuit (207) outputs a prompt information which is corresponding to a matching status or a non-matching status of the electronic cigarette case (20) and the electronic cigarette (30), on the basis of the indication signal of the microprocessor (200).

15. The method for identifying an electronic cigarette according to claim 14, wherein a following step is further comprised before the step S2:

S12: a trigger circuit (209) sends a trigger signal to the microprocessor (200), the microprocessor (200) identifies the electronic cigarette (30) after receiving the trigger signal.

16. The method for identifying an electronic cigarette according to claim 14, wherein a following step is further comprised after the step S3:

S4: the microprocessor (200) outputs a control signal to a switch circuit (203) according to a matching result of the electronic cigarette case (20) and the electronic cigarette (30); the switch circuit (203) connects or disconnects an electrical connection path between the first interface (204) and the power supply battery (202), on the basis of the control signal from the microprocessor (200), so that a charging path between the electronic cigarette case (20) and the electronic cigarette (30) is switched on or switched off.

17. The method for identifying an electronic cigarette according to claim 14, wherein if the identification information generation module (301) in the step S1 outputs the identification information by a wireless transmission mode, a following step is further comprised before the step S1:

S01: the identification information generation module (301) prestores the identification information;

if the identification information generation module (301) in the step S1 outputs the identification information by a wired transmission mode, a following step is further comprised before the step S1: S02: a first interface (204) of the electronic cigarette case (20) is electrically connected to a second interface (304) of the electronic cigarette (30).

18. The method for identifying an electronic cigarette according to claim 14, wherein before the step S2, a following step is further comprised:

S12: a trigger circuit (209) sends a trigger signal to the microprocessor (200), the microprocessor (200) identifies the electronic cigarette (30) after receiving the trigger signal;

After the step S3, a following step is further comprises:

S4: the microprocessor (200) outputs a control signal to a switch circuit (203) according to a matching result of the electronic cigarette case (20) and the electronic cigarette (30) in step S3; the switch circuit (203) connects or disconnects an electrical connection path between a first interface (204) and a power supply battery (202), on the basis of the control signal from the microprocessor (200), so that a charging path between the electronic cigarette case (20) and the electronic cigarette (30) is switched on or switched off;

if the identification information generation module (301) in the step S1 outputs the identification information by a wireless transmission mode, a following step is further comprised before the step S1: S01: the identification information generation module (301) prestores the identification information;

if the identification information generation module (301) in the step S1 outputs the identification information by a wired transmission mode, a following step is further comprised before the step S1: S02: a first interface (204) of the electronic cigarette case (20) is electrically connected to a second interface (304) of the electronic cigarette.

* * * * *